(12) United States Patent
Amesar et al.

(10) Patent No.: US 7,717,506 B2
(45) Date of Patent: May 18, 2010

(54) CHILD RESTRAINT APPARATUS FOR VEHICLE

(75) Inventors: Pankaj Tulsidas Amesar, Charlotte, NC (US); Barry Mahal, York, SC (US); David Gardiner Downie, Hampshire (GB); Mark Robert Pitcher, Surrey (GB); David Shaun Carine, Hampshire (GB); Christopher Hankinson, Staffordshire (GB)

(73) Assignee: Britax Child Safety, Inc., Charlotte, NC (US)

( * ) Notice: Subject to any disclaimer, the term of this patent is extended or adjusted under 35 U.S.C. 154(b) by 122 days.

(21) Appl. No.: 11/954,979

(22) Filed: Dec. 12, 2007

(65) Prior Publication Data

US 2009/0152913 A1 Jun. 18, 2009

(51) Int. Cl.
*B60N 2/42* (2006.01)
(52) U.S. Cl. .................................................. 297/216.11
(58) Field of Classification Search .............. 297/216.1, 297/216.11, 256.15, 284.59
See application file for complete search history.

(56) References Cited

U.S. PATENT DOCUMENTS

| 1,468,072 A * | 9/1923 | Ogle ........................... 128/889 |
| 3,770,315 A | 11/1973 | Smitile et al. |
| 4,555,140 A | 11/1985 | Nemoto |
| 4,611,851 A | 9/1986 | Noyes et al. |
| 5,033,133 A * | 7/1991 | Nissen ........................... 5/653 |
| 5,184,844 A * | 2/1993 | Goor ........................... 280/733 |
| 5,558,398 A | 9/1996 | Santos |
| 5,829,829 A | 11/1998 | Celestina-Krevh |
| 7,070,238 B1 | 7/2006 | Alexander et al. |
| 7,125,073 B2 | 10/2006 | Yoshida |
| 7,232,182 B2 | 6/2007 | Yoshida |
| 7,234,771 B2 * | 6/2007 | Nakhla ..................... 297/250.1 |
| 2003/0047972 A1 * | 3/2003 | Burleigh et al. ......... 297/216.11 |
| 2008/0258518 A1 | 10/2008 | Santamaria |

FOREIGN PATENT DOCUMENTS

DE 20 2006 010 876 U1 11/2006

OTHER PUBLICATIONS

Nelson, Jr., Milton; USPTO Office Action; Apr. 1,2009; pp. 1-11; USPTO; Arlington, VA, USA.

* cited by examiner

*Primary Examiner*—Sarah B McPartlin
(74) *Attorney, Agent, or Firm*—Adams Intellectual Property Law

(57) ABSTRACT

A child restraint apparatus relates to holding a child within a vehicle interior. The apparatus has a body with an internal area for receiving a child. An energy absorbing member extends in use over at least part of an external surface of the body. This energy absorbing member faces away from the internal area.

10 Claims, 5 Drawing Sheets

CHILD RESTRAINT APPARATUS FOR VEHICLE

BACKGROUND OF THE INVENTION

The present invention relates to a child restraint apparatus for example a child car seat for use in a vehicle. In particular, the present invention concerns such apparatus for reducing the risk of injury to passengers present in the vehicle who are seated adjacent said child car seat in the event of a vehicle accident or the like.

In this connection, it is well known to provide child car seats to carry children and infants safely in vehicles. Most commonly, the child car seat is located on the rear seat of a vehicle and is attached or restrained to the vehicle seat using a connection which makes use of a standard vehicle seat belt or dedicated connection points such as lower anchors, top tethers or those of the Isofix type. That said, child car seats may also be located on a front passenger seat of a vehicle, in which case, the child car seat is usually attached using the front passenger seat belt.

When located on the rear seat of a vehicle, the seat area taken up by a child car seat typically extends over the at least the width of one of the rear seat cushions. As such, additional passengers are able to occupy the remaining rear vehicle seats, including the seat immediately adjacent the seat cushion occupied by the child car seat.

In terms of their structure, child car seats typically comprise a seat portion, a back portion and a head portion to support the child or infant occupant. The child car seat may also comprise raised side portions, which serve to restrict transverse movement of the child in the child car seat. The seat, back, head and raised side portions are commonly formed of a plastics material. The child car seat thereby effectively provides a rigid protective shell or body which at least partially surrounds the occupant of the child car seat. The seat, back, head and side portions of the child car seat may be covered in foam or other suitable cushioning materials on their inner facing surfaces to provide both a soft comfortable support for the child or infant against the underlying harder rigid plastic surfaces, and furthermore to provide cushioning against the internal surfaces of the shell should the child car seat be subjected to a sudden acceleration or deceleration.

In the event of a collision with another vehicle or object, such child car seats serve to properly restrain an occupant of the seat and to improve their immediately subsequent kinematics, thereby reducing the severity of injury to the child or infant. Further impact protection is afforded by the rigid shell which partially surrounds the occupant of the child car seat.

In a side impact to the vehicle, the fixings of the child seat with the vehicle, e.g. lower anchors, top tethers, Isofix connection points or the seat belt, may as a result of sufficient forces from the vehicle impact, permit the child car seat to move to some degree in a direction substantially in line with the direction of the vehicle impact. The amount and direction of movement of the child car seat will depend on a number of factors including the magnitude and direction of vehicle impact and the fixing method employed. A passenger occupying a seat adjacent to the child car seat, for example the middle rear seat of the vehicle, may as a result be impacted by the child car seat as the child car seat moves. Consequently, a passenger sitting adjacent the child seat may themselves suffer injury to the side of their body, including the torso, arms and/or upper leg areas, depending on the shape of the child car seat and where precisely the child car seat impacts the passenger.

In addition to injury that may be caused to an adjacent passenger, the impact of the child car seat on the adjacent passenger may also cause a sudden deceleration to the child car seat. This sudden deceleration may in turn cause injury to the occupant of the car child seat, as a result of the potentially high forces exerted in particular on the child seat occupant=s head and neck.

If the side impact of the vehicle should however occur on the opposite side of the vehicle, i.e. when the child car seat is positioned furthest from the point of impact on the rear seat of a vehicle, then there is a risk that the adjacent passenger to the child car seat will in this instance move towards the child car seat. Again there is a risk that the adjacent passenger will be injured as a result of impact with the child car seat, for example injury to the pelvis. Similarly, the occupant of the child car seat, due to the sudden impact, may be subjected to unduly high forces in particular to the occupant=s head and neck. Furthermore, the impact of the adjacent passenger with the child car seat may also in turn result in the child car seat impacting with the interior side of the vehicle and causing further injuries to the occupant of the child car seat.

The present invention seeks to overcome the aforementioned problems and seeks to reduce the likelihood of injury to a passenger sitting adjacent a child restraint such as a child car seat.

BRIEF DESCRIPTION OF THE INVENTION

The above mentioned needs and others that will be readily apparent to those skilled in the art are met by the invention, which in one aspect provides a child restraint apparatus for restraining a child within a vehicle interior. The apparatus has a body comprising an internal area for receiving a child, and an energy absorbing member which, in use, extends over at least part of an external surface of the body and which faces away from the internal area. The energy absorbing member seeks to cushion an impact that may occur with a passenger adjacent the child restraint apparatus in the event of a crash and thereby reduce the likelihood of injury to the passenger.

Optionally, the energy absorbing member comprises a deformable chamber. A deformable chamber allows the energy absorbing member to be deflated allowing the child restraint apparatus to be more readily stored. The chamber then need only be deployed when the child restraint apparatus is installed in a vehicle.

Optionally, the deformable chamber has a vent, the vent being configured to allow controlled expulsion of air from the chamber on deformation thereof. The vent seeks to allow the dissipation of energy during impact with an adjacent passenger to be controlled.

Optionally, the chamber is provided with open cell foam. Open cell foam is a readily available material which may be easily formed to the required configuration and which provides resilient, controlled air release characteristics.

Optionally, the energy absorbing member comprises one or more resilient layers. In this way, layers may be provided each with different energy absorbing characteristics and thereby the properties of the energy absorbing member may be tailored to the particular application.

Optionally, the energy absorbing member comprises an air tight membrane around its periphery. The air tight membrane seeks to ensure that in the event of an impact, air is only permitted to escape through the vent provided in the chamber in a controlled manner.

Optionally, the energy absorbing member is attached to the child restraint apparatus using fastening means. Suitable fixings means may include plastic rivets, hook and loop type fastenings, adhesive or snap fittings.

Optionally, the energy absorbing member is attached to the outer side edge of the child restraint apparatus along one edge of the said energy absorbing member. In this way, the energy absorbing member can be folded away from the outer side edge of the child restraint apparatus to assist with inflation or deflation of the energy absorbing member or to conceal an orifice or vent.

According to a further aspect of the present invention there is provided a method of operating a child restraint apparatus within a vehicle, the apparatus having an externally positioned energy absorbing member in the form of a vented deformable chamber, the method comprising the steps of providing the child restraint apparatus in a vehicle interior with the chamber collapsed and the vent closed, then with the child restraint apparatus in position in vehicle, opening the vent such that air enters the chamber, the vent thereafter being left open so as to provide controlled venting in the event of a deformation of the chamber as a result of an accident. The energy absorbing member need only be deployed when the child restraint apparatus is installed in a vehicle, thereby allowing the child restraint apparatus to be more easily stored and handled.

BRIEF DESCRIPTION OF THE DRAWINGS

Several aspects of the invention have been set forth above. Other aspects will be readily apparent to one skilled in the art when the following detailed description of the invention is considered in conjunction with the accompanying drawings.

DETAILED DESCRIPTION OF THE INVENTION

Figure 1:
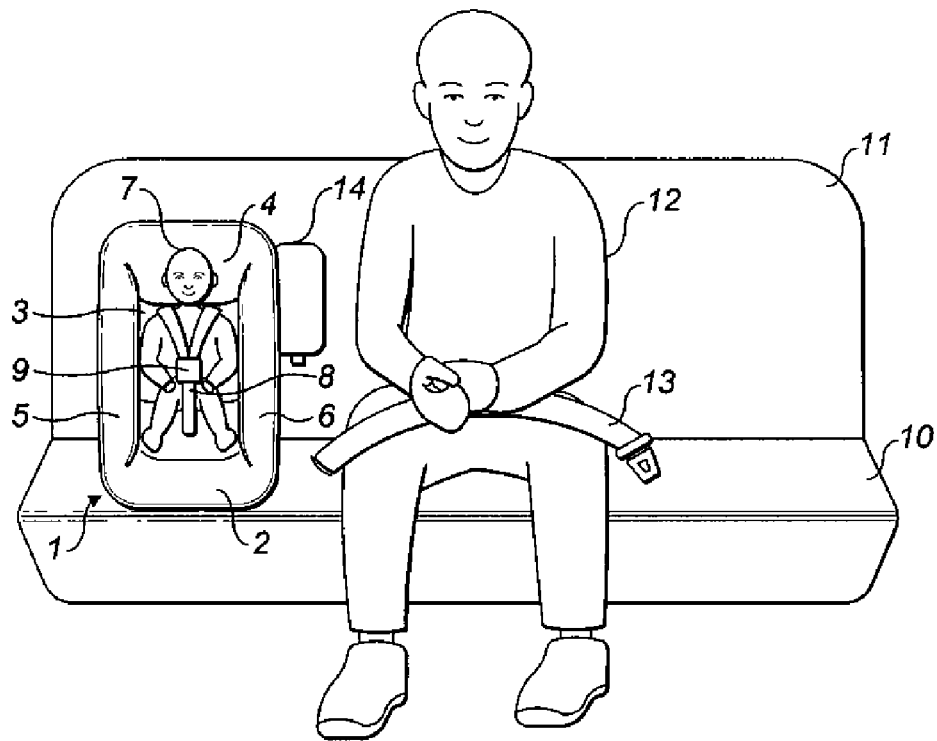
FIG. 1 is a front view of a child restraint apparatus installed in a vehicle comprising an energy absorbing member in a preferred embodiment of the present invention.

FIG. 1 shows a child restraint apparatus in the form of a child car seat shown generally as 1. The child car seat 1 comprises a seat portion 2, a back portion 3, a head portion 4 and side portions 5,6 to form a substantially rigid shell or body portion which partially surrounds the occupant 7 of the child car seat. The body comprises an internal area for receiving a child and the car seat 1 is further provided with an adjustable safety harness 8 and a buckle 9 which serves to restrain the child 7 in the seat 1.

In the embodiment shown in FIG. 1, the child car seat 1 is located on the right side of a rear seat bench 10 of a vehicle with respect to the direction of travel. In the embodiment shown, the occupant of the child car seat is facing forwardly, i.e. away from the rear vehicle seat back 11. The child car seat is attached by means of an Isofix type connection (not shown). When in position, the child seat 1 takes up the area of one rear vehicle cushion, thereby leaving the seats or cushions adjacent to the installed child car seat free for other passengers to use.

A passenger 12 seated in the middle or central rear vehicle seat is restrained by a lap belt 13, although some vehicles may be provided with 3-point safety belts.

On an external surface of the body of the child car seat, an energy absorbing member 14 is provided, which extends over at least part of an external surface of the body. The energy absorbing member 14 faces away from the internal area of the seat, where a child may be restrained.

Figure 2:
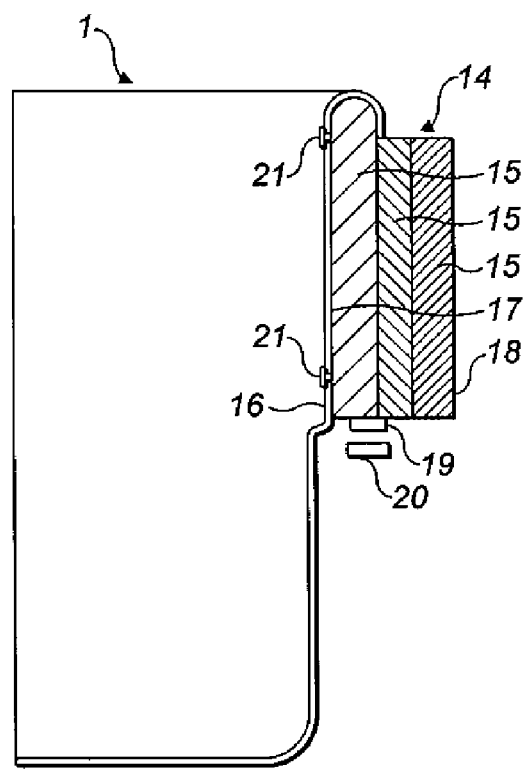
FIG. 2 is a section through the child restraint apparatus and energy absorbing member as shown in FIG. 1.

FIG. 2 shows a section through the child car seat 1 and the energy absorbing member 14. The energy absorbing member 14 comprises three layers 15 of open cell foam aligned with the left side edge 16 of the child car seat or shell portion. In their inner edge 17 the foam layers 15 are formed to the outer surface of the left side 16 of the child car seat 1. The foam layers 15 are resilient and provide a certain degree of elastic deformability. The layers of foam 15 are covered with an air tight membrane 18, formed of canvas or other suitable material, around the outer periphery of the device 14 to produce a deformable chamber. In a lower surface of the membrane, a vent in the form of an orifice 19 is provided. In this embodiment, the location of the orifice 19 is chosen such that the orifice 19 is not blocked as a result of contact between the side 17 of the energy absorbing member 14 and the side of the shell portion 16 or an adjacent passenger 12. The orifice 19 may be provided with a sealing cap 20. The foam layers 15 may be compressed and the device deflated and sealed using the cap 20 in order to assist in installation and storage of the child restraint apparatus.

The energy absorbing member 14 is attached to the child car seat using plastic rivets 21. Alternative forms of attachment include for example adhesive, hook and loop type fasteners or snap fittings.

When the child car seat 1 is installed in a vehicle, the sealing cap 20 is removed and air is allowed to flow through the orifice 19 into the air tight membrane 18, and thereby allow the open cell foam 15 to expand to its normal uncompressed state. Once installed, the orifice 19 is left open.

In the event of a crash, in particular from a side impact with another vehicle or object, even with the child seat 1 being fixed to the vehicle seat 10, there will be a tendency for the child car seat 1, or the passenger adjacent the child seat 1, to move as a result of the high impact forces. In the case of a passenger sitting adjacent to the child seat to which no energy absorbing member is attached, the child car seat will impact with the adjacent passenger with a risk that the force of impact will cause injury to both the passenger and the occupant of the child car seat.

When the child car seat 1 is provided with the energy absorbing member 14 on its outer side 16 between the child car seat 1 and an adjacent passenger 12, the risk of injury to both adjacent passenger 12 and the occupant 7 of the child car seat 1 can be reduced. In the event of a crash, the impact of an adjacent passenger 12 on the energy absorbing member 14, causes the open cell foam 15 to be compressed, causing air to be exhausted through the vent or orifice 19. Because the open cell foam 15 compresses and deflates on impact with the adjacent passenger 12, it thereby decelerates the passenger 12 and/or child car seat 1 depending on the direction of impact and protects the passenger 12 from the rigid plastic shell 16 of the child car seat. Further, as air is allowed to exhaust from the energy absorbing member 14, there is less likelihood that the adjacent passenger 12 will rebound after impact with the child car seat 1.

The size of the vent or orifice 19 affects the rate at which air may be exhausted and thereby influences the ability of the energy absorbing member 14 to reduce the impact forces of the child car seat on an adjacent passenger. If the energy absorbing member is allowed to deflate too rapidly, then bottoming out occurs and little or no protection is afforded. However, if the foam layers 15 are too resilient and/or air is not allowed to escape from the orifice 19 at a fast enough rate, there is a risk that the child car seat 1 will rebound off an adjacent passenger 12. The energy absorbing member may be provided with a number of vents to allow air to escape in the event of an impact.

FIGS. 3a to 3e show the steps involved in inflating an energy absorbing member 14 attached to a child restraint apparatus 1.

Figure 3A:
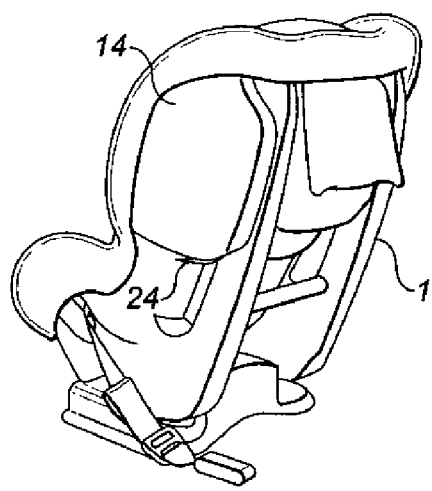
FIGS. 3a to 3e show a side and rear view of a child restraint apparatus and the steps involved in inflating an energy absorbing member extending over a part of the external surface thereof.
Figure 3B:
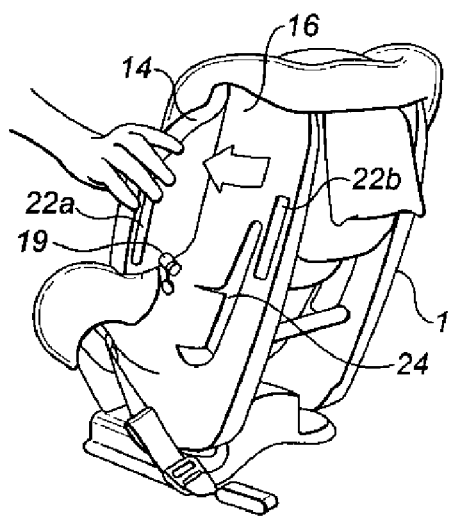

In FIG. 3a, the energy absorbing member 14 is lying in a deflated state against the outer side edge 16 of the child seat 1. In the embodiment shown, the energy absorbing member 14, is attached along one substantially vertical edge to the outer side edge 16 of the child car seat 1 such that the energy absorbing member may be folded outwardly and forwardly toward the front of the child seat 1 as shown in FIG. 3b in order to access the orifice or vent 19. The other substantially vertical edge of the energy absorbing member is provided with a strip 22a of hook and loop type material corresponding with a similar strip 22b provided on the outer side edge 16 of the child seat 1. These strips 22a, 22b seek to ensure that the energy absorbing member remains against the side edge 16 and prevent interference with the vent 19. The child seat 1 is provided with a locating member 24, which protrudes from the outer side edge 16 of the seat 1 to maintain the bottom edge of the energy absorbing member 14 in a predetermined location.

Figure 3C:
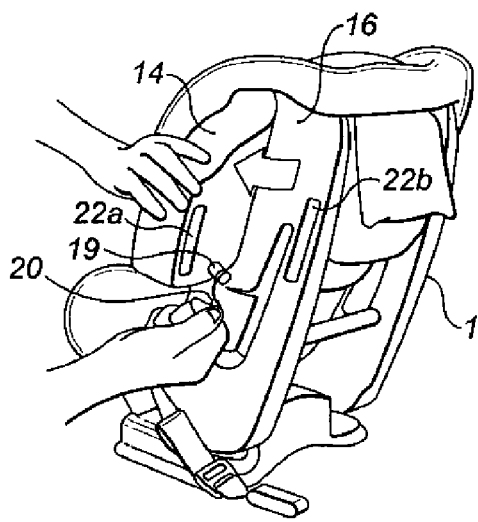
Figure 3D:
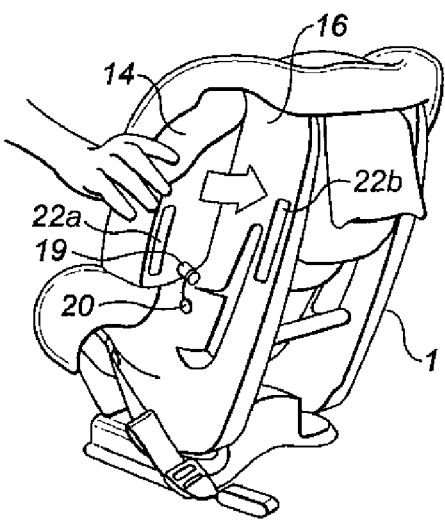
Figure 3E:
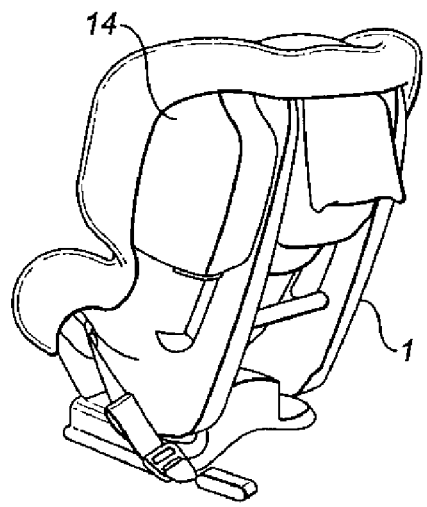

Once the energy absorbing member 14 has been folded forward and the vent 19 has been exposed, the cap 20, is removed such that the vent 19 is open to allow air to enter the energy absorbing member 14 as shown in FIG. 3c. Due to the resilient open cell foam structure of the energy absorbing member 14, the energy absorbing member 14 inflates to its inflated state as shown in FIG. 3d. The energy absorbing member may then be folded back to lye against the outer side edge of the child seat 1 as shown in FIG. 3e with the cap 20 removed such that the orifice 19 is left open.

FIGS. 4a to 4h show the steps to deflate the energy absorbing member 14 attached to an outer side edge 16 of a child restraint apparatus 1.

Figure 4A:
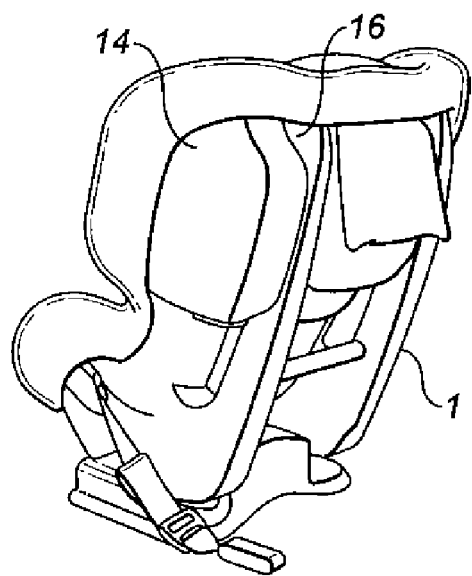
FIGS. 4a to 4h show a side and rear view of a child restraint apparatus and the steps involved in deflating an energy absorbing member extending over a part of the external surface thereof.
Figure 4B:
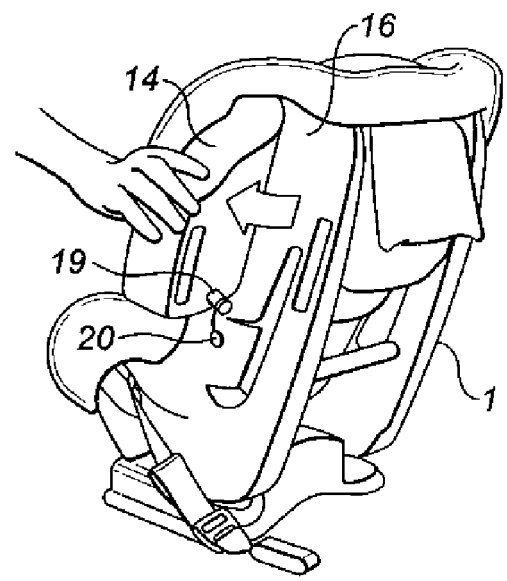
Figure 4C:
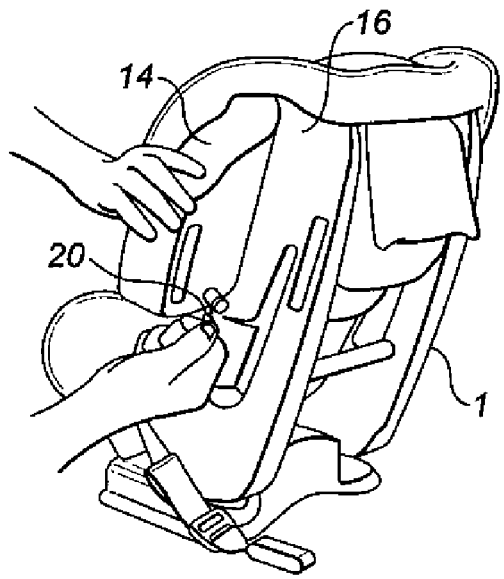
Figure 4D:
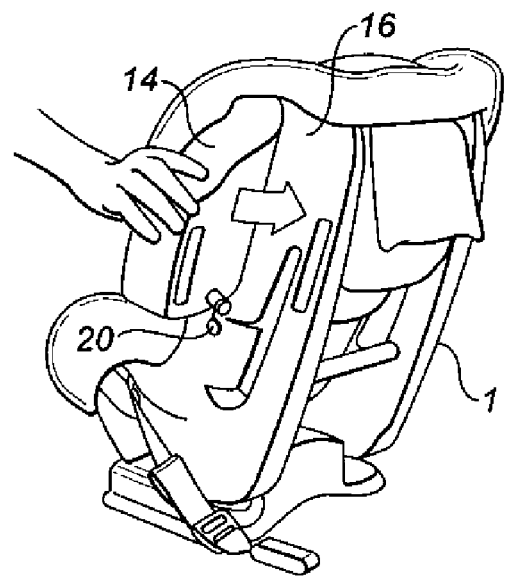

FIG. 4a shown the energy absorbing member 14 in an inflated state lying against the outer side edge 16 of the child restraint apparatus in the form of a child seat 1. In this position, the orifice 19 is concealed by the energy absorbing member 14 and thereby protected from interference. When deflation is required, the energy absorbing member 14 is folded forward to reveal the orifice or vent 19 and cap 20 as shown in FIG. 4b. The cap 20 is placed on the vent 19 as shown in FIG. 4c. The energy absorbing member 14 is then folded back against the out side edge 16 of the child seat 1 as shown in FIG. 4d.

Figure 4E:
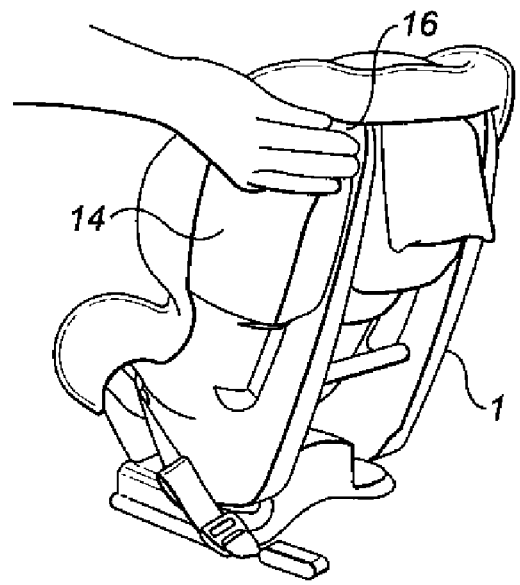
Figure 4F:
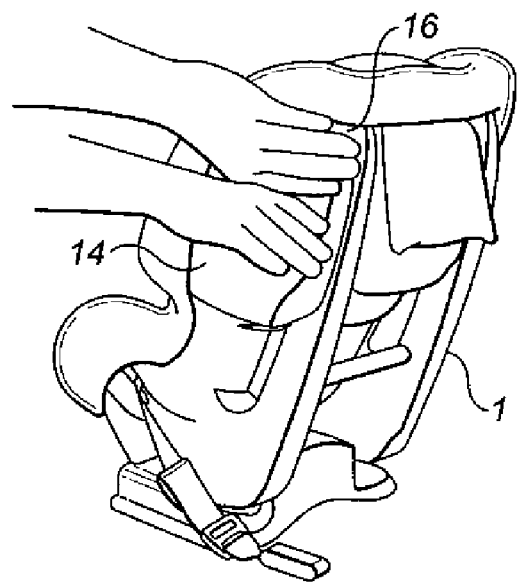
Figure 4G:
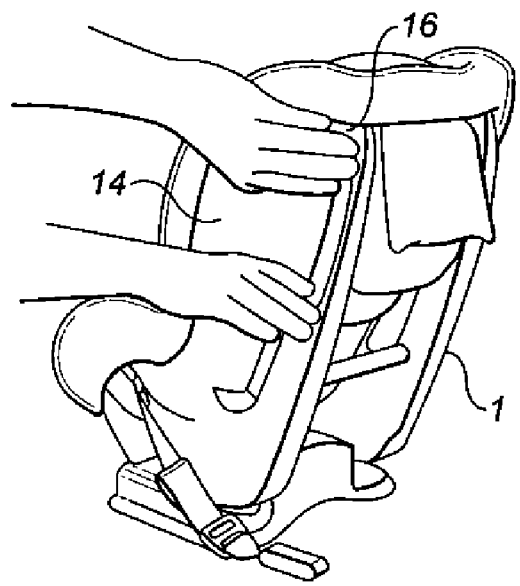
Figure 4H:
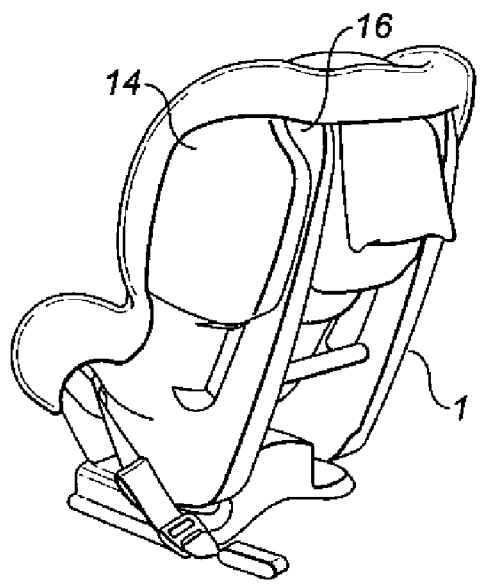

The energy absorbing member 14 is deflated by compressing the energy absorbing member 14 against the outer side edge 16 of the child seat 1. To deflate the energy absorbing member 14 fully, compression, which may be performed by hand, starts initially at the top of the energy absorbing member 14 and then proceeding towards the middle and bottom of the energy absorbing member 14 as shown in FIGS. 4e, 4f and 4g respectively. With the cap 20 in place, air may be expelled from the energy absorbing member but cannot enter; the cap thereby effects a one-way valve. FIG. 4h shows the energy absorbing member 14 in its uninflated state.

Figure 5:
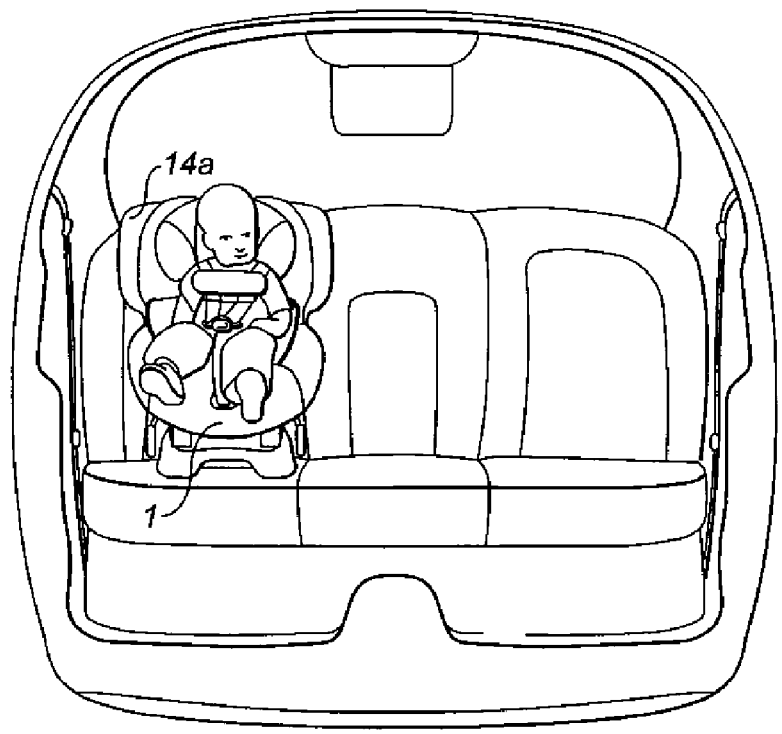
FIG. 5 is a front view of a child restraint apparatus installed in a vehicle comprising an energy absorbing member in a further preferred embodiment of the present invention.

In a further embodiment, an energy absorbing member 14a is provided between the child car seat 1 and the interior wall of the vehicle as shown in FIG. 5 to reduce the impact between the interior wall and child car seat 1 in the event of a crash.

Figure 6:
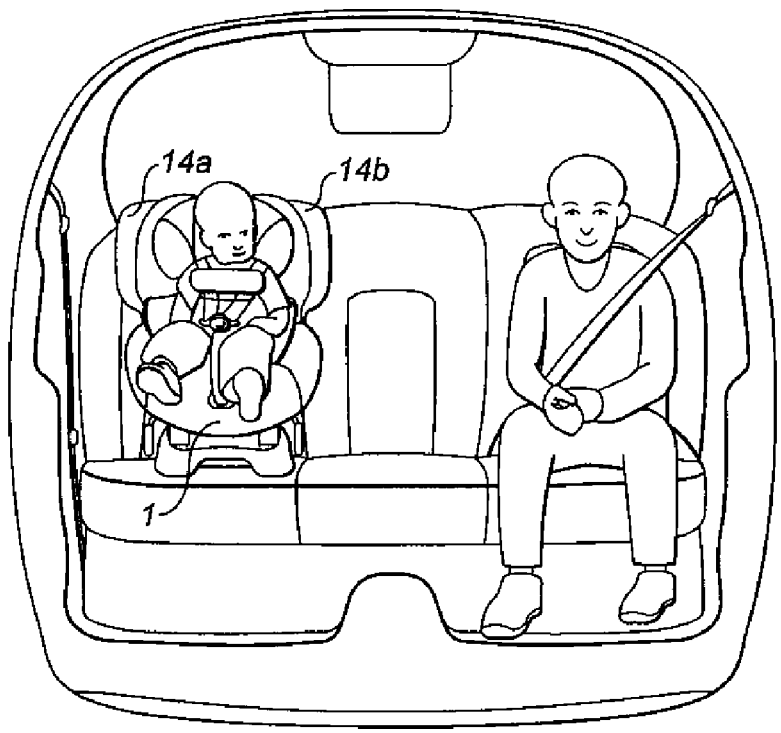
FIG. 6 is a front view of a child restraint apparatus installed in vehicle comprising an energy absorbing member in a further preferred embodiment of the present invention.

In a further embodiment the child car seat is provided with an energy absorbing member 14a, 14b on both sides of the child seat 1 as shown in FIG. 6 to reduce the impact between the interior wall and child car seat 1 in the event of a crash and also an adjacent passenger. Such an arrangement would also be useful in the case that the child car seat is positioned in the centre or middle rear seat of a vehicle to protect adjacent passengers on either side of the vehicle.

Although the energy absorbing member has been shown comprised of open cell foam layers, alternative embodiments include hollow airbags and combinations of open cell foam layers and EPS [Expanded Polystyrene]. The size of the air vent and type and combination of layers is chosen to provide optimum deceleration characteristics.

The energy absorbing member may be formed in different shapes and be located at various positions on the side of the child card seat to provide optimum protection against impact with an adjacent passenger. The thickness of the energy absorbing member may be limited by the ability of a passenger to sit adjacent to the child car seat and the projection. Typically the thickness of the energy absorbing member is 100 mm.

An additional energy absorbing member may be provided at a lower level of the child seat in order to seek to reduce the impact with the pelvis of an adjacent passenger in the event of a crash. Alternatively the energy absorbing member may be extended over the full side surface of the child seat.

When the energy absorbing member is deflated, it may be stored by being rolled inside or underneath a cover of the child seat, folded, or placed in a separate pocket. To assist in the deflation of the energy absorbing member, a bellows may also be provided, comprising a hard surface for compressing the member.

In an alternative embodiment, an energy absorbing member may be formed as a separate stand alone unit, into which the child seat may be located.

Although, described with reference to child car seats, the energy absorbing member may be applied to child booster seats, infant carriers, cots, both forward and rearward facing systems, and other child restraint systems (CRS) and the like.

The invention claimed is:

1. Child restraint apparatus for restraining a child within a vehicle interior, the apparatus having a body comprising an internal area for receiving a child, and an energy absorbing member which, in use, extends over at least part of an external surface of the body and which faces away from the internal area, the energy absorbing member comprising an airtight membrane enclosing a layered arrangement of resilient foam that in its uncompressed state substantially defines the shape of the energy absorbing member, each layer of foam of the layered arrangement having a different energy absorbing characteristic, the airtight membrane further including a vent defined therethrough that provides an open air flow pathway between an interior chamber of the airtight membrane and the exterior, such that air is expelled from the chamber upon impact and air is taken in to re-inflate the chamber for a subsequent use, wherein the air flow pathway through the vent remains open prior to and subsequent to impact.

2. Child restraint apparatus according to claim 1, the vent being configured to allow controlled expulsion of air from the chamber on deformation thereof.

3. Child restraint apparatus according to claim 1, wherein the foam layers comprise open cell foam.

4. Child restraint apparatus according to claim 1, wherein the energy absorbing member comprises one or more resilient layers.

5. Child restraint apparatus according to claim 1, wherein the energy absorbing member is attached to the child restraint apparatus using fixing means.

6. Child restraint apparatus according to claim 5, wherein the fixing means comprises plastic rivets.

7. Child restraint apparatus according to claim 5, wherein the fixing means comprises hook and loop type fastenings.

8. Child restraint apparatus according to claim 1, wherein the energy absorbing member is attached to an outer side edge of the child restraint apparatus along one edge of the said energy absorbing member.

9. Child restraint apparatus according to claim 1, wherein a further energy absorbing member is provided at a lower level of the child seat.

10. A method of operating a child restraint apparatus within a vehicle, the apparatus having an externally positioned energy absorbing member in the form of a vented deformable chamber, the method comprising the steps of:

providing a child restraint apparatus including an energy absorbing member comprising an airtight membrane enclosing a layered arrangement of resilient foam that in its uncompressed state substantially defines the shape of the energy absorbing member, each layer of foam of the layered arrangement having a different energy absorbing characteristic, the airtight membrane further including a vent defined therethrough that provides an open air flow pathway between an interior chamber of the airtight membrane and the exterior, such that air may be expelled from the chamber upon impact and air is taken in to re-inflate the chamber for a subsequent use, wherein the air flow pathway through the vent remains open prior to and subsequent to impact;

providing the child restraint apparatus in a vehicle interior with the chamber collapsed and the vent closed, then with the child restraint apparatus in position in vehicle, opening the vent such that air enters the chamber, the vent thereafter being left open so as to provide controlled venting in the event of a deformation of the chamber as a result of an accident.

\* \* \* \* \*